United States Patent [19]

Morgan et al.

[11] 4,315,133
[45] Feb. 9, 1982

[54] APPARATUS PROTECTING A LENS FROM AIRBORNE PARTICULATES

[75] Inventors: John H. Morgan, Albuquerque; Larry W. Sutton, Peralta, both of N. Mex.

[73] Assignee: GTE Automatic Electric Laboratories, Inc., Northlake, Ill.

[21] Appl. No.: 149,804

[22] Filed: May 12, 1980

[51] Int. Cl.³ .............................................. B23K 27/00
[52] U.S. Cl. ........................ 219/121 FS; 219/121 LY
[58] Field of Search ............... 219/121 FS, 121 LY, 219/121 LC, 121 LD, 121 L, 121 LM

[56] References Cited

U.S. PATENT DOCUMENTS 3,601,576  8/1971  Schlafli et al. ............ 219/121 FS X
4,031,351  6/1977  Martin ..................... 219/121 FS X Primary Examiner—C. L. Albritton
Attorney, Agent, or Firm—Russell A. Cannon

[57] ABSTRACT

During scribing of a ceramic plate with a laser beam, ceramic particles rise from the workpiece in a direction of motion that is generally the same as that of the workpiece. The lens on a laser scriber is protected from abrasive contact with such particulates in the atmosphere by slipping the base of a housing over the circumference of the lens mount and forming a generally airtight seal between them. The housing is shaped like a frustum of a right circular cone, with the apex end thereof truncated and essentially rolled over to form an orifice through which the lens axis and laser beam pass. A plurality of streams of pressurized air are introduced into the housing near the midpoint of the frustum and the lens surface. The air streams are introduced tangent to the inner surface of the housing and angled downward for producing a vortex of air that is exhausted to the atmosphere through the orifice at a velocity and vorticity that inhibits particulates outside of the cover entering the orifice. A suction hose is located in front of the housing for removing particulates from this area. In an alternate embodiment, a directional air lock door is established in front of the lens, with the airstream that establishes the door being directed into a suction hose. The direction of this airstream is preferably maintained the same as the direction that the workpiece moves.

8 Claims, 5 Drawing Figures

APPARATUS PROTECTING A LENS FROM AIRBORNE PARTICULATES

BACKGROUND OF THE INVENTION

This invention relates to lens protectors and more particularly to apparatus for inhibiting high velocity particulate contaminants in the atmosphere contacting the lens surface in a laser machine such as a scriber.

Laser beams are used in numerous operations such as machining, drilling, cutting cloth, and scribing grid lines in the surface of thin ceramic plates on which a plurality of hybrid circuits are formed prior to the plate being separated into individual substrates and circuits. During the scribing of a ceramic plate that moves in a grid pattern under a laser beam, for example, ceramic dust and minute ceramic particles that are torn from the plate by the laser beam fan out in a rooster tail that moves upward in a direction generally the same as that of movement of the ceramic plate and toward the surface of a lens in the laser. These flying particles may have sufficient velocity to pit the lens surface if they are allowed to strike it. With sufficient pitting, the lens no longer focuses the laser beam. In a prior-art laser scriber machine, two tubes are supported proximate the lens surface so as to blow air at right angles to the lens axis and into the mouth of a vacuum hose. This produces an air lock door between the lens and a ceramic plate that is being scribed. Unfortunately, this technique is ineffective for blocking the passage of ceramic particles when a ceramic plate is moved in more than one direction in a common plane during a scribing operation. In a laser system using this technique, it was found necessary to disassemble the equipment and clean the lens a number of times each day. It was also necessary to replace the lens a number of times each week. An object of this invention is the provision of improved apparatus for protecting the lens in a laser machine by discouraging particulate contaminant in the atmosphere from contacting the lens surface.

SUMMARY OF THE INVENTION

In accordance with this invention, an optical system having a lens with an exterior surface through which a laser beam passes, the laser beam being directed in a straight line for contacting a workpiece, first means for providing multidirectional relative movement of the workpiece with respect to the line and laser beam in a plane orthogonal to the line, and second means producing a directional stream of gas moving between the lens and workpiece and across the line for protecting the exterior lens surface by impeding contaminant particulates from the workpiece contacting the lens, includes the improvement comprising third means for causing the direction of the stream of gas to be such that a major vector component thereof is maintained in a direction that is either orthogonal to or the same as the direction of a current relative movement of the workpiece with respect to the laser beam and line.

DESCRIPTION OF DRAWINGS

This invention will be more fully understood from the following detailed description of preferred embodiments thereof, together with the drawings in which.

DESCRIPTION OF PREFERRED EMBODIMENTS

Figure 1:
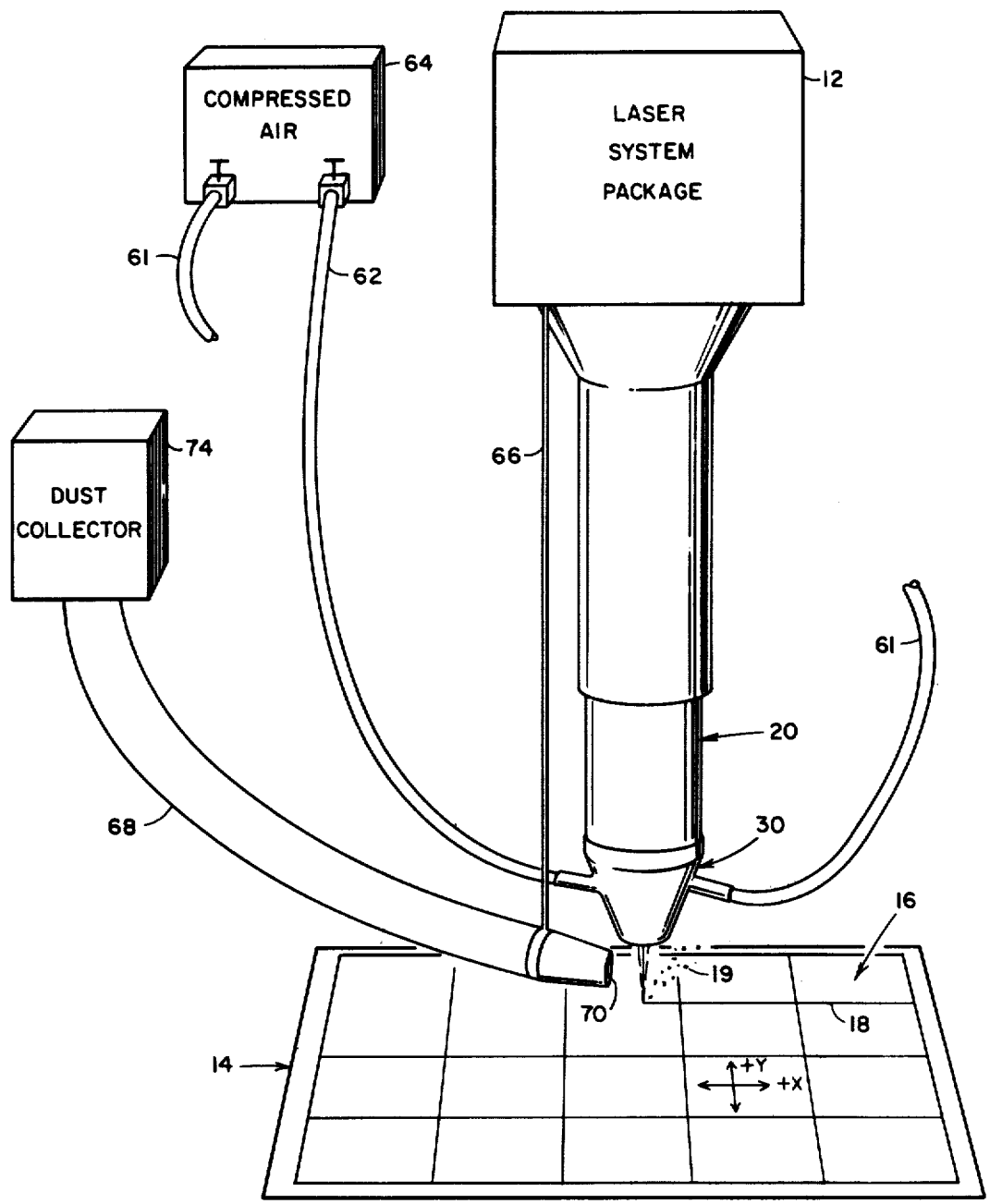
FIG. 1 is a perspective view of a laser scriber system embodying this invention.

The scriber equipment in FIG. 1 comprises a laser system package in an enclosure 12 that is suspended in a fixed location above a table top 14 on which a thin ceramic plate 16 is located. The plate 16 may be secured to the table top in the conventional manner such as by a vacuum created on the underside thereof, clamps contacting the top thereof, or alignment posts contacting adjacent edges thereof and a plunger forced against the opposite corner of the plate that is truncated at 45°. The lens barrel 20 on the bottom of the enclosure 12 is oriented to make the axis A—A of the lens 22, and thus the axis of the laser beam, orthogonal to the top of the plate 16 (see FIG. 2). In operation, the table top 14 and plate 16 move in a prescribed pattern under a stationary enclosure and laser beam for producing scribe lines 18 in the top of the ceramic plate. As the plate moves underneath the laser beam, ceramic dust and small ceramic particles 19 that are torn from the plate by high intensity radiation in the laser beam fan out in a rooster tail that moves generally in a vertical direction in FIG. 1 and in the same direction that the plate moves. These flying particulates may have a high velocity and are very abrasive to the exterior surface of a germanium or glass lens 22 in the laser system. Systems including a laser package 12 and movable table 14 are conventional and available from vendors such as Photon Sources, Inc. and from Coherent Company.

In accordance with this invention, apertured enclosure means supporting a plenum is formed in conjunction with and over the front of the exterior surface of the lens 22 in the laser system so as to produce a confined air stream exhibiting a Venturi effect and/or vortexing as the compressed air is exhausted into the atmosphere through an aperture that is coaxial with the lens axis. The air stream moving through the enclosure means exhibits reduced pressure and increased rate of flow through the aperture, over that in the area of the lens, for preventing the major portion of particulate matter in the atmosphere entering the enclosure means and pitting the lens surface. In a preferred embodiment of this invention, the enclosure means supports a confined vortex of air that is exhausted into the atmosphere through an aperture with sufficient velocity and vorticity to deaccelerate and deflect the major amount of particulate matter in the atmosphere away from the aperture.

Figure 2:
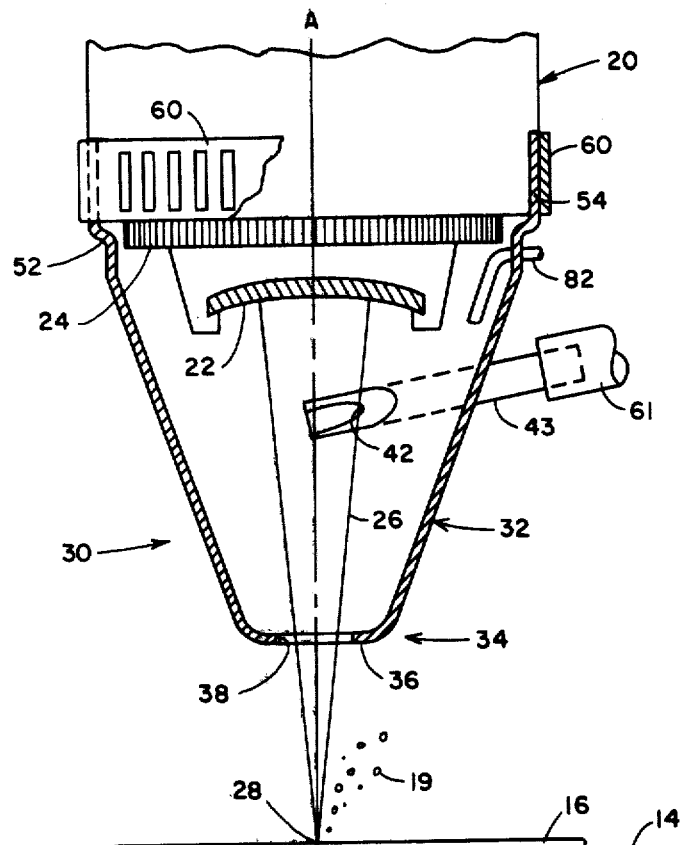
FIG. 2 is an enlarged front elevation view of the housing 30 mounted on the lens barrel 20 in FIG. 1, with the lens 22 and housing 30 shown in section.
Figure 4:
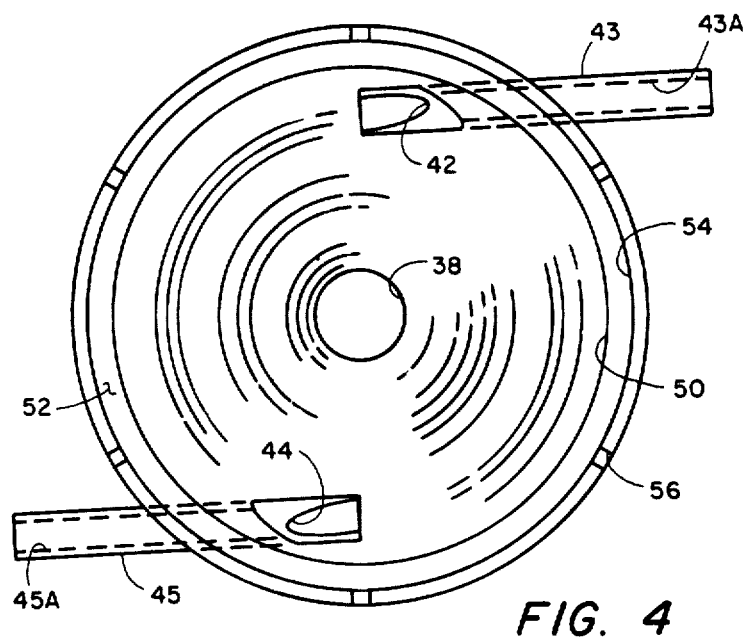
FIG. 4 is a top view of the housing.
Figure 3:
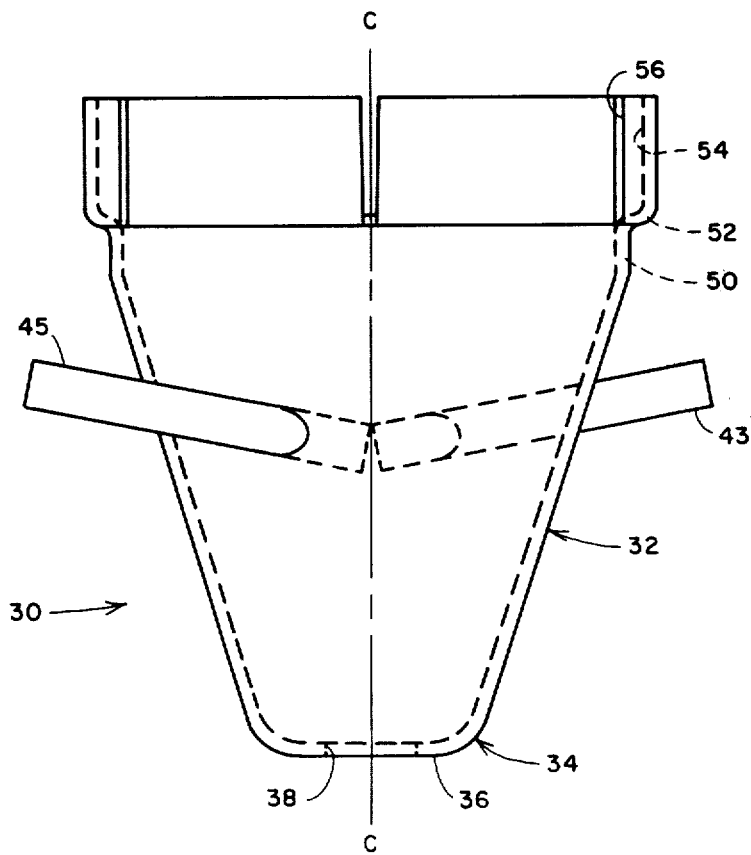
FIG. 3 is a front elevation view of the housing.

Referring now to FIGS. 3 and 4, the enclosure means comprises a hollow conically shaped cover or housing 30 that is spun from an aluminum disk in a preferred embodiment of this invention. Alternatively, the housing may be machined from a solid piece of metal or plastic, formed out of sheet metal, molded, made of materials other than metal, or made of metals other than aluminum. The housing 30 is essentially a frustum 32 of a right circular cone having a curved section 34 joining the conical section 32 thereof to a flat end 36 on it. A hole or orifice 38 in the end of the housing is coaxial with the axis C—C of the cone (see FIG. 3) and is slightly larger than the circumference of the laser beam in this area (see FIG. 2). Diametrically spaced apart openings 42 and 44 are cut through the wall of the conical section near the middle thereof. Tubes 43 and 45 are inserted into these openings with the inside surfaces of the tubes substantially parallel to the tangent to the inner surface of the conical section. The tubes are also inclined at an acute angle with respect to a plane orthogonal to the axis C—C and the paper in FIG. 3. The tubes are then welded onto the cover in the specified orientation. The ends of the tubes that are inside the conical section are preferably polished off so as to be flush with the inner surface of the housing and provide a smooth surface over the full length thereof, with the lines 43A and 45A along the inner surfaces of the tubes being tangent to the inner surface of the conical section.

The base of the conical section 32 is formed into a cylindrical section 50 that is flared out over a shoulder 52 into a cylindrical flange 54. A plurality of slots 56 are cut through the flange 54 over the length thereof. The diameter of the cylindrical section 50 is greater than that of the lens mount 24 that is threaded into the end 21 of the lens barrel (see FIG. 2). The diameter of the cylindrical flange 54 is slightly greater than that of the end 21 of the lens barrel. A neoprene sleeve may be located between the flange 54 and lens barrel for providing a complete airtight seal here, although such a sleeve has not been found necessary. The length of the cylindrical flange 54 is sufficient for securely holding the housing onto the lens barrel.

In the laser scriber in FIGS. 1 and 2, the lens 22 focuses ray 26 of laser light to a point 28 on top of a ceramic plate 16. In accordance with this invention, the flange 54 on the base or open end of the housing is slid over the lens barrel until the shoulder 52 contacts the end of the lens barrel (see FIG. 2). A captive worm drive type clamp 60 is positioned over the flange 54 and tightened to squeeze the sectioned portions of the latter together and securely attach the housing to the lens barrel. This also creates a generally airtight seal at the base of the housing. The pipes or tubes 43 and 45 preferably open into the housing in a plane that is adjacent to the exterior surface of the lens. The pipes are connected through associated hoses 61 and 62 to a source 64 of pressurized air. A flange 66 on the enclosure 12 supports a vacuum hose 68 with the open end 70 thereof immediately below and adjacent to the opening 38 in the housing. The other end of the hose 68 is connected to a dust collector 74 that moves a high volume of air.

The operation of the system is believed to be according to the following analyses. The lens 22 focuses radiant energy in a laser beam to a point 28 on the surface of the ceramic plate 16. The diameter of the orifice 38 in the end of the housing is only slightly greater than the diameter of the laser beam as it passes through this opening. Compressed air from the tubes 43 and 45 enters the housing substantially tangent to the inside surface of the conical section and rotates in a counterclockwise direction there (see FIG. 4). Since the base of the housing is closed by the end of the lens barrel, the compressed air whirls around inside the housing as it moves toward the constriction or orifice 38 in the center of the apex end of the frustum where it is exhausted to the atmosphere. This moving mass of air in the housing is a vortex which is essentially a mass of fluid with a whirling or circular motion that tends to form a cavity or vacuum in the center of a circle and to draw toward this cavity bodies subject to its action. The vorticity of the moving air is a vector measure of the local rotation thereof and is obtained by taking the curl of the flow velocity. The vorticity is a measure of the rate of rotation of the air fluid here, and in a uniformly rotating fluid is substantially twice the angular velocity.

In an equilibrium condition, it is apparent that the mass rates of flow of air into and out of the housing are the same. Consideration of the characteristics of a vortex and the flow of fluid through the orifice 38 reveals that the moving air in the housing exhibits a Venturi effect. In this moving mass of air, the pressure decreases as one moves radially inward toward the axis of the frustum and downward toward the orifice 38 where it is at atmospheric pressure. This means that the velocity of moving air increases dramatically as one moves radially inward toward the axis C—C and axially toward the orifice 38. The high velocity and vorticity of air exhausted to the atmosphere through the openings 38 has been found to be sufficient to disperse particulates in the atmosphere so as to discourage the majority of flying ceramic particles 19 that are torn from the plate 16 by the laser beam entering the orifice and contacting the lens surface. More specifically, the high velocity vortical air flow operates to spin ceramic particles radially (generally orthogonal to the axis A—A) and into the mouth of the vacuum hose that pulls them into a filter type sink associated with the dust collector.

In a laser scribing machine embodying this invention that was satisfactorily operated, the laser produced a continuous light beam of 125 watts average power in the 10.6 micron wavelength range and was associated with a concavo-convex germanium lens having a 2.5 inch focal length. In this system, the lens measured 1 inch in diameter and was spaced approximately 2.5 inches from the surface of a ceramic plate on the table top. The housing for the lens was spun from a 3.75 inch diameter aluminum disk that was 0.50 inch thick. The inner diameter of the housing was 1.875 inches at the base of the conical section 32 which had an apex angle of 40°. The lens was spaced 1.5 inches from the orifice plate or truncated end 36 of the housing which was approximately 1 inch from the ceramic workpiece. A 7/16 inch diameter orifice in the end of the housing was only $\frac{1}{8}$ inch larger than the diameter of the laser beam as it passed therethrough. The conical section of the housing was connected to the truncated end thereof through a curved section that extended over a length of approximately 5/32 inch. The openings 42 and 44 in the housing were located approximately $\frac{3}{8}$ inch below the center of the lens. The pipes 43 and 45 were $\frac{1}{4}$ inch diameter aluminum tubes having 3/16 inch inner diameters. The tubes were oriented at an angle of 5° with the horizontal and the axes thereof parallel to the tangent to the inner surface of the cone prior to welding them into the cover. The source 64 operated at 85 psi and the dust collector 74 moved 1500 cubic feet of air per minute through a 4 inch diameter suction hose 68. In this system, the laser operated in a scribing operation for 32 continuous hours without cleaning the lens and for over 600 hours without replacing it, whereas it was necessary to clean the lens every 4 hours and replace it every 80 hours of scribing operation in a system employing a unidirectional air lock door to protect the lens.

Figure 5:
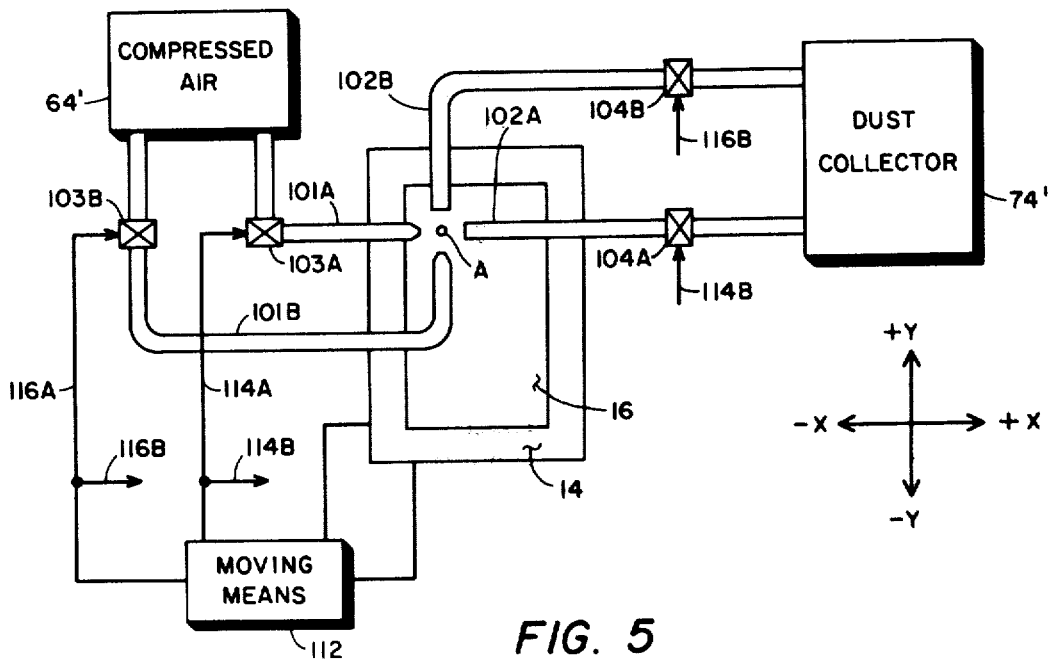
FIG. 5 is a plan view of an alternate embodiment of this invention.

In an alternate embodiment of this invention, a plurality of air hoses 101 and associated vacuum hoses 102 have the open ends thereof disposed around the lens axis A—A in a common plane that is immediately below the apertured end of a housing 30 and orthogonal to the lens axis. This structure is generally illustrated in FIG. 5, which is a plan view looking away from the housing and along the lens axis. In this arrangement, the means 112 provides movement of the table top 14, and thus the workpiece 16, in the x and y directions. The open ends of the hoses are radially spaced generally 90° apart about the axis of the lens. They are oriented so that the hose 101A can blow compressed air in the +x direction in the common plane, across the lens axis A—A, and into the open end of the associated vacuum hose 102A. Similarly, the hose 101B can blow air directly across the front of the lens and into the vacuum hose 102B. The valves 103A and 104A are responsive to operation of means 112 that provides movement of the table top in the +x direction for selectively passing compressed air in the common plane in the same direction, i.e., between hoses 101A and 102A. Similarly, valves 103B and 104B are responsive only to signals from means 112 indicating movement of the table top in the +y direction for then passing compressed air in the common plane in the +y direction, i.e. between hoses 101B and 102B. This operation of the valves 103 and 104 selectively sets up directional air lock doors in front of the lens and the apertured end of the housing. The airstreams establishing these airlock doors are moving in the same direction as a workpiece on the table top. The laser is selectively turned on only when the table is moving in the +x or +y direction.

It has been observed that the plume of ceramic particles rising from a substrate that is being scribed is generally angled in the same direction that a workpiece moves, i.e. when a ceramic plate being scribed moves in the +x direction, the top of the plume of debris moves generally in the same +x direction. A directional airlock door in front of the lens and formed by air moving in a direction that is the same as that of a workpiece moves the majority of particulates away from the lens and into the vacuum hose. In the airstream in an airlock door moves in the opposite direction as the workpiece, a large number of particulates are deflected toward the lens. If the air stream moves in a direction orthogonal to that of the workpiece, a large number of particulates are deflected away from the lens. In accordance with the embodiment of this invention in FIG. 5, ones of the valves 103 and 104 are selectively actuated so as to form airlock doors with airstreams moving in the same direction as a workpiece for effectively deflecting ceramic particles away from the small orifice in the housing and into an associated vacuum nozzle. The air streams can also be oriented so that only a major vector component thereof is directed orthogonal to or in the same direction the workpiece moves. In practice, four sets of air nozzles and vacuum hoses are spaced at approximately 90° intervals around the lens axis A—A with associated valves synchronized with movement of the worktable for selectively individually establishing directional airlock doors in the x and y directions. The valves associated with the vacuum and air lines may be commercially available cam-operated air valves that are actuated by movement of the table top.

Although this invention is described in relation to preferred embodiments thereof, variations and modifications will occur to those skilled in the art. By way of example, the housing may be of any shape that supports a movement of air exhibiting vortexing and/or a Venturi effect and exiting the orifice in the constricted end of the housing with a velocity that is sufficient for dispersing the majority of particles and inhibiting them entering the orifice and contacting the lens surface. This operation and movement of air also causes particulates and dust inside of the housing to be drawn out of it. Also, a non-vortexing movement of air through the housing and exhibiting only a Venturi effect may be utilized for inhibiting contact of particles with the lens. This may be accomplished by inserting a plurality of tubes, such as the tube 82 in FIG. 2, through the wall of the conical section 50 with the lengths thereof inside the housing substantially parallel to the inner surface of the conical section. Pressurized gas pumped into the housing through these tube-type nozzles then flows in streamlines generally parallel to the walls of the conical section and with an increased velocity through the orifice 38 for producing a force on particulates 19 in the atmosphere that causes them to move away from the orifice and thus the lens. And other type devices causing a flow of gas in a confined space which causes the velocity of the moving fluid to increase as it moves in an axial direction may be used in place of the housing. Additionally, the surface of revolution of the housing may be a paraboloid of revolution or some other smoothly curved and continuous shape. The inner surface of revolution of the housing may also be formed by a plurality of connected straight line segments in a section view thereof taken along the axis of revolution. Or, it may be a closed surface other than a surface of revolution. Further, the truncated end 36 of the housing may be flat. Also, the pipes 43 and 45 may be oriented other than tangentially to the inner surface of the housing, although this is believed to be the optimum orientation. And the pipes may be oriented orthogonal to the axis of the housing and accomplish the desired result, since the moving air will be directed to the apex end of the conical section in an equilibrium condition. Further, the pipes may be oriented at an angle of greater than 50° with respect to the axis C—C in FIG. 3, although an angle of much greater than this may reduce the vorticity of the gas moving in the housing. Also, this invention is useful in applications other than scribing ceramic plates. In regard to the embodiment in FIG. 5, the cover 30 may be omitted in an arrangement where one or more directional air lock doors are established in parallel planes in front of the lens. Ones or all of these stacked air lock doors may be operated at the same time in the same direction, or in different directions that may be fixed. Also, the hoses 101A and 102A may be arranged so as to continuously change direction or rotate about the line A—A in synchronism with movement of the table for maintainting the direction of the air lock door established thereby in the same direction as movement of the table. The scope of this invention will therefore be determined from the appended claims rather than from the aforementioned detailed descriptions of preferred embodiments thereof.

We claim:

1. In an optical system including a lens with an exterior surface through which a laser beam passes, the laser beam being directed in a straight line for contacting the workpiece, first means providing multidirectional relative movement of the workpiece with respect to the line and laser beam in a plane orthogonal to the line, and second means producing a directional stream of gas moving between the lens and workpiece and across the line for protecting the exterior lens surface by impeding contaminant particulates of the workpiece contacting the lens, the improvement comprising machine means for adjusting the direction of the stream of gas for maintaining a major vector component thereof in a direction that is one of a direction orthogonal to and the same as the direction of a current relative movement of the workpiece with respect to the laser beam and line.

2. The improvement according to claim 1 wherein said machine means causes the direction of the major vector component of the stream of gas to be maintained generally the same as the direction of the current relative movement of the workpiece with respect to the laser beam.

3. The improvement according to claim 2 wherein said machine means causes the direction of the stream of gas to be orthogonal to the line and the same as the direction of current relative movement of the workpiece with respect to the laser beam.

4. The improvement according to claim 1 wherein said machine means causes the direction of the major vector component to be such that the associated minor vector component of the stream of gas (which is orthogonal to the major vector component thereof) has a direction that is one of the same as and orthogonal to, respectively, the direction of the current relative movement of the workpiece.

5. Apparatus according to claim 1 wherein said machine means causes the direction of the major vector component of the stream of gas to be maintained orthogonal to the direction of current relative movement of the workpiece with respect to the laser beam.

6. The improvement according to claim 1 or 4 wherein the major vector component is directed along a radius of a semicircle that has its base orthogonal to the line and orthogonal to the direction of current relative movement of the workpiece.

7. In apparatus including a laser system producing a laser beam that is incident in a straight line on a broad surface of a workpiece, first means for providing multidirectional relative movement of the workpiece with respect to the line and laser beam in a plane that is generally orthogonal to the line, and second means producing a directional stream of gas between the laser system and workpiece and across the line for protecting the laser system by impeding contaminant particulates of the workpiece contacting it, the improvement comprising machine means for adjusting the direction of the stream of gas to be such that a major vector component thereof is maintained in a direction that is one of a direction orthogonal to and the same as the direction of current relative movement of the workpiece with respect to the laser beam and the line.

8. Apparatus according to claim 7 wherein said machine means causes the direction of the stream of gas to be generally orthogonal to the line and the same as the direction of current relative movement of the workpiece with respect to the laser beam.

* * * * *